United States Patent [19]
James

[11] Patent Number: 5,680,708
[45] Date of Patent: Oct. 28, 1997

[54] TEMPERATURE COMPENSATED TILT SENSOR

[75] Inventor: John J. James, Los Gatos, Calif.

[73] Assignee: Precision Navigation, Inc., Mountain View, Calif.

[21] Appl. No.: 585,908

[22] Filed: Jan. 16, 1996

[51] Int. Cl.$^6$ .................................................. G01C 9/06
[52] U.S. Cl. ............................................................. 33/366
[58] Field of Search ........................... 33/367, 366, 377; 331/56; 324/721

[56] References Cited

U.S. PATENT DOCUMENTS

| | | | |
|---|---|---|---|
| 4,521,973 | 6/1985 | Wiklund et al. | 33/377 |
| 5,170,567 | 12/1992 | Davis et al. | 33/377 |
| 5,381,604 | 1/1995 | Heidel et al. | 33/377 |
| 5,552,703 | 9/1996 | Hore | 33/366 |
| 5,612,679 | 3/1997 | Burgess | 33/366 |

*Primary Examiner*—G. Bradley Bennett
*Attorney, Agent, or Firm*—Joseph Smith

[57] ABSTRACT

A new tilt sensor system is disclosed which provides substantial temperature independence and is very inexpensive to build and to operate. The apparatus is made up of a first source of a first alternating signal having an output impedance Rs1 and a second source of a second alternating signal which is equal in magnitude and 180 degrees out of phase with the first alternating signal, with the source of the second alternating signal having an output impedance Rs2. Also included is a tilt sensor having a first input terminal coupled to receive the first alternating signal, a second input terminal coupled to receive the second alternating signal, and an output terminal which provides an output signal in response to the first alternating signal and the second alternating signal. In the preferred mode, the tilt sensor has an impedance G1 between the first terminal and the output terminal and an impedance G2 between the second terminal and the output terminal. In addition, Rs1=Rs2 and Rs1 is substantially smaller in magnitude than [G1+G2].

9 Claims, 1 Drawing Sheet

Detector

TEMPERATURE COMPENSATED TILT SENSOR

BACKGROUND OF THE INVENTION

This invention relates to tilt sensors, and in particular to electrical circuits for tilt sensors which eliminate temperature effects.

Shown in FIG. 1 is a typical electrolytic tilt sensor 11. It consists of a tubular glass envelope 10 partially filled with an electrolytic (i.e. partially conducting) fluid which contacts metal electrodes 13, 15, and 17. At zero tilt angle, the impedance between the outer electrodes, 13 and 17, and the center electrode 15, are equal. As the sensor is tilted, however, the fluid stays level, thus changing the impedance on one side relative to the other. The impedances on each side varying inversely with tilt angle, and the sensor generally provides a signal proportional to tilt. The impedance on each side of the sensor is typically about 4k Ohms to about 10k Ohms, although this impedance can vary considerably depending on the supplier and application. In the prior art, it is customary to drive these tilt sensors with a sinusoidal voltage with expensive matched resistors in series with each electrode. This configuration leads to large variations in output voltage on the center electrode as a function of temperature.

What is needed is a new driver configuration which eliminates this temperature dependence.

SUMMARY OF THE INVENTION

In accordance with preferred embodiments of the invention, a new tilt sensor system is disclosed which provides substantial temperature independence and is very inexpensive to build and to operate. The apparatus is made up of a first source of a first alternating signal having an output impedance Rs1 and a second source of a second alternating signal which is equal in magnitude and 180 degrees out of phase with the first alternating signal, with the source of the second alternating signal having an output impedance Rs2. Also included is a tilt sensor having a first input terminal coupled to receive the first alternating signal, a second input terminal coupled to receive the second alternating signal, and an output terminal which provides an output signal in response to the first alternating signal and the second alternating signal. In the preferred mode, the tilt sensor has an impedance G1 between the first terminal and the output terminal and an impedance G2 between the second terminal and the output terminal; Rs1=Rs2; and Rs1 is substantially smaller in magnitude than [G1+G2].

BRIEF DESCRIPTION OF THE DRAWINGS

Shown in FIG. 1 is a typical prior art electrolytic tilt sensor.

Shown in FIG. 2 is a tilt sensor system in accordance with preferred embodiments of the invention.

DESCRIPTION OF THE PREFERRED EMBODIMENTS

Figure 1:
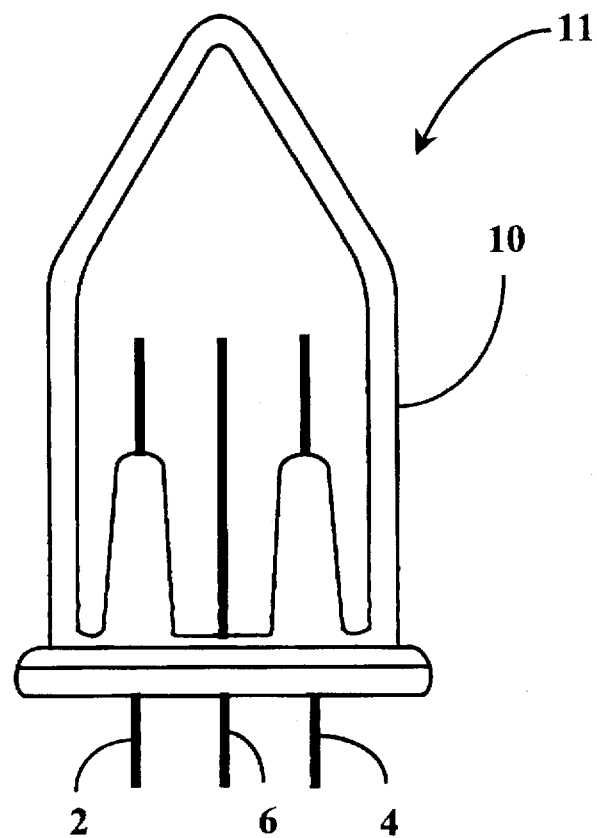
Figure 2:
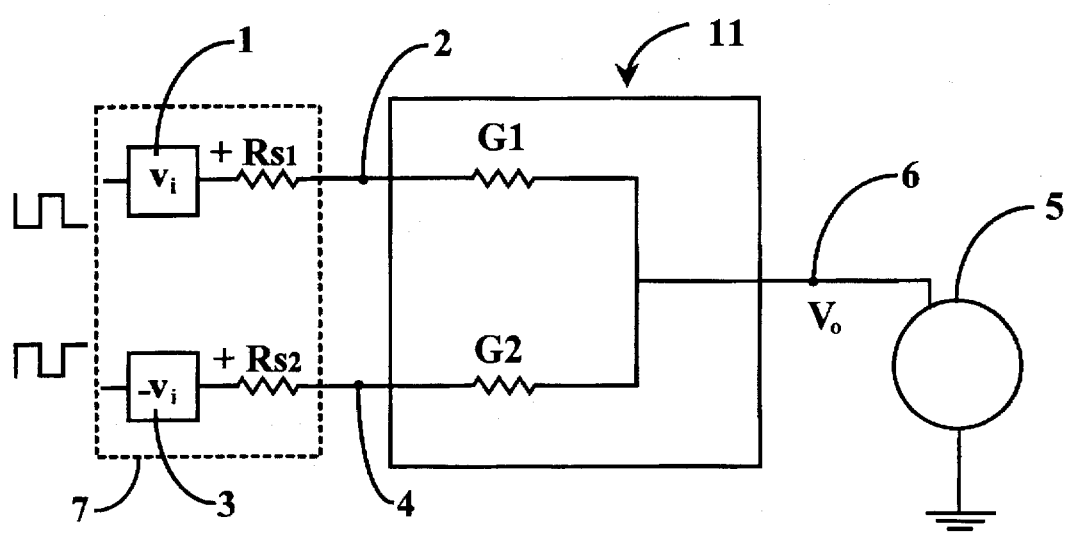

Shown in FIG. 2 is a preferred embodiment of a temperature compensated tilt sensor system. It is made up of a standard electrolytic tilt sensor 11 having input electrodes 2 and 4 and a center (output) electrode 6, for example such as tilt sensor part no. SP5003-A-005 from Spectron Systems Technology Inc. of Hauppauge, N.Y. In the preferred mode, the input electrodes 2 and 4 are driven out of phase with each other by a very low impedance driver 7. Typical frequencies usually range from 100 Hz to 5 KHz. The top end could be higher, however, since it is limited only by the capacitance of the detector system. The input driver 7 is represented by the two voltage sources 1 and 2, source 1 providing a voltage Vi and having an output impedance equal to Rs1, and source 2 providing an opposite voltage −Vi (i.e. 180 degrees out of phase) and having an output impedance Rs2. Source 1 is coupled to input terminal 2 of tilt sensor 11 and source 2 is coupled to input terminal 4 of tilt sensor 11. The output voltage of tilt sensor 11, i.e. Vo, is measured at terminal 6 of tilt sensor 11 by a high impedance phase sensitive detector 5, e.g. a digital voltmeter triggered off the output of the one of the voltage sources 1 or 2. In the simplest case, even a sample and hold circuit could be used for the detection process. As will be apparent from the equations to follow, knowing the phase information permits one to know the direction of tilt.

The temperature compensation effects can best be understood by reference to the following analysis. Equation (1) shows the relationship between the output voltage and the input voltage as a function of the circuit parameters.

$$Vo=Vi\{[Rs2-Rs1]+[G2-G1]\}/[Rs1+Rs2+G1+G2] \quad (1)$$

where G1 represents the impedance between terminals 2 and 6 of the tilt sensor, and G2 represents the impedance between terminals 4 and 6 of the tilt sensor.

The first thing to be noticed about equation (1) is that if the output resistances Rs1 and Rs2 are not equal, then Vo will not be zero when G1=G2, i.e. the output voltage will not be zero when the tilt is zero. Such a circumstance would have serious problems, since it would cause the electrolytic material in the tilt sensor 11 to plate out onto the electrodes, eventually disabling the sensor. Hence, one must choose the sources for the input voltages such that Rs1=Rs2. Those skilled in the art will also understand that for the same reasons, i.e. to avoid plating, one must accurately maintain a 50% duty cycle.

When the output resistances of the input voltage sources are chosen to be equal, equation (1) is reduced to:

$$Vo=Vi\{G2-G1\}/[Rs1+Rs2+G1+G2] \quad (1A)$$

If one does a Taylor expansion of equation 1A in the source impedance, to first order one obtains equation (2) as follows:

$$Vo \doteq Vi[G2-G1]/[G1+G2]+Vi[G 1-G2][Rs1+Rs2]/\{[G1+G2][G1+G2]\}. \quad (2)$$

Note that the second term in equation (2) varies as the inverse square of the sum of the tilt sensor impedances. Hence, if Rs1 and Rs2<<[G1+G2], then $$Vo \doteq Vi[G2-G1]/[G1+G2]. \quad (3)$$

For example if the input impedances Rs2 and Rs2 are less than one-tenth of the sum of the tilt sensor impedances, [G1+G2], then equation (3) is valid to within about 10%. Similarly if the input impedances are say less than one-one hundredth of the tilt sensor impedances, equation (3) is valid to within about a 1 part in a thousand.

To understand the temperature dependence, one can generally represent the impedances G1 and G1 as follows:

$$G1=R1^*k(T) \quad (4)$$

$$G2=R2^*k(T); \quad (5)$$

i.e. G1 and G2 can be represented as their separate respective resistances times the same normalized temperature-dependent function k(T), since presumably the fluid inside the tilt sensor 11 will all be at the same temperature.

Equation (3) then reduces to $$Vo = Vi [R2-R1]/[R1+R2], \quad (6)$$

since the temperature dependence cancels out.

Those skilled in the art will understand that there are many ways in which these driving source conditions can be conveniently met, especially since the driving voltage does not need be very high, usually about 5 volts for ease of detection. For example, one could use matched amplifiers (e.g. two LMC 6062 buffer amplifiers), or for example one could use a clock signal and its inversion from a D-type flip flop, or for example two CMOS type inverters in order to obtain the proper rail to rail clamping, or even operational amplifiers with precision resistors. All of these sources can be obtained with output impedances of less than about 20 Ohms.

Other implications are also readily apparent. Most importantly, it quite clear from the derivation that in order to achieve temperature independence, that the input voltage sources must be chosen so that the their source impedances are substantially smaller than the sum of the impedances of the tilt sensor, preferably such that the sum of the tilt sensor impedances are at least ten times larger, more preferably 100 times larger, or most preferably, even a thousand times larger if one wants a high resolution tilt sensor. Thus, it is typical to choose tilt sensors for the system that have impedances of about 20k Ohms or higher.

Those skilled in the art will appreciate that there are many variations that can be made to the invention as shown in the preferred embodiments without departing from the spirit and scope of the invention. For example, there are numerous choices of particular oscillators that have not been described, kinds of resistors, and detectors, and couplings of other devices to make use of the output of the sensor. In addition, the sensor used could be used on two axes simultaneously. All of these various choices should be considered included in the invention to the extent they are covered by the appended claims and their equivalents.

What is claimed is:

1. Apparatus for sensing tilt, comprising:

a first source of a first alternating signal having an output impedance Rs1;

a second source of a second alternating signal which is equal in magnitude and 180 degrees out of phase with said first alternating signal, said source of said second alternating signal having an output impedance Rs2;

a tilt sensor having a first input terminal coupled to receive said first alternating signal, a second input terminal coupled to receive said second alternating signal, and an output terminal which provides an output signal in response to said first alternating signal and said second alternating signal, wherein said tilt sensor has an impedance G1 between said first terminal and said output terminal and an impedance G2 between said second terminal and said output terminal, and wherein Rs1=Rs2 and wherein Rs1 is substantially smaller than [G1+G2].

2. Apparatus as in claim 1 wherein [G1+G2] is at least 10 times larger than Rs1.

3. Apparatus as in claim 1 wherein [G1+G2] is at least 100 times larger than Rs1.

4. Apparatus as in claim 1 wherein [G1+G2] is at least 1000 times larger than Rs1.

5. Apparatus as in claim 1 further comprising a detector coupled to receive said output signal from said output terminal.

6. Apparatus as in claim 1 wherein said first alternating signal is provided by a clock signal from a D-type flip flop and said second alternating signal is provided by an inverted clock signal from said D-type flip flop.

7. Apparatus as in claim 1 wherein said first alternating signal comprises a square wave.

8. A method of operating a tilt sensor, comprising:

providing a first alternating signal from a first input source to a first input terminal of said tilt sensor;

providing a second alternating signal from a second input source to a second input terminal of said tilt sensor which is equal in magnitude and 180 degrees out of phase with said first alternating signal;

wherein said tilt sensor has an impedance between said first terminal and an output terminal equal to G1, and wherein said tilt sensor has an impedance between said second terminal and said output terminal equal to G2, and wherein said first input source and said second input source each have an output impedance R which is much less than [G1+G2].

9. The method of claim 8 further comprising detecting an output signal from said output terminal of said tilt sensor.

* * * * *